Jan. 30, 1951

S. HARRIS 2,539,740

HINGED MOLDING FLASK FOR EXTENSIVE
ACRYLIC BRIDGEWORK

Filed July 14, 1950

SAMUEL HARRIS
INVENTOR

BY *Joseph Blacker*

ATTORNEY

Jan. 30, 1951
S. HARRIS
2,539,740
HINGED MOLDING FLASK FOR EXTENSIVE ACRYLIC BRIDGEWORK
Filed July 14, 1950
2 Sheets-Sheet 2
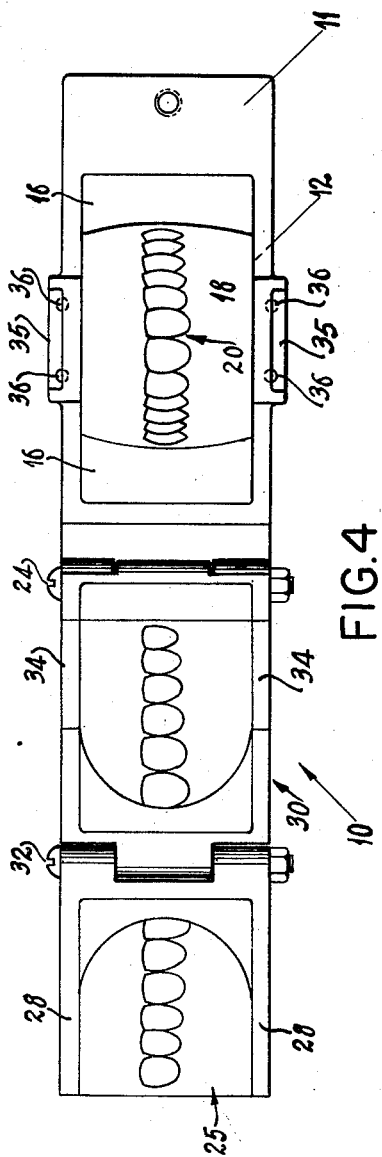
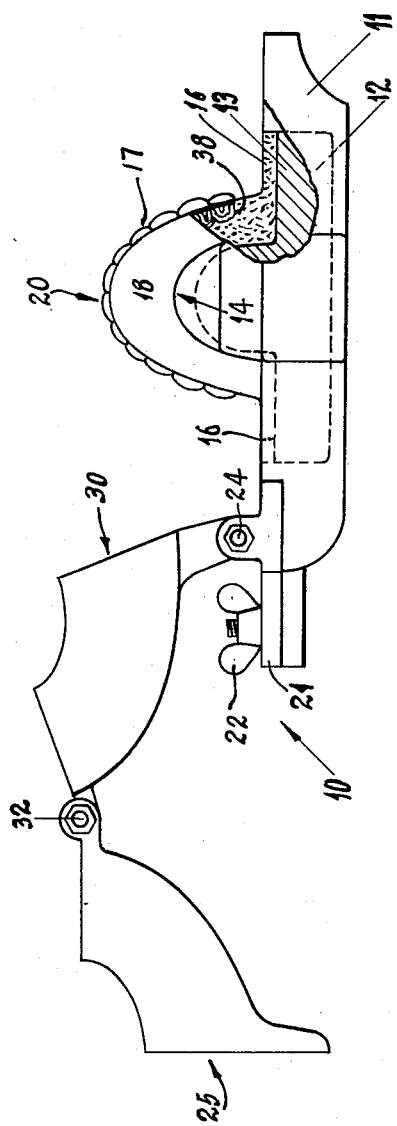
SAMUEL HARRIS
INVENTOR
BY *Joseph Blacker*
ATTORNEY Patented Jan. 30, 1951

2,539,740

UNITED STATES PATENT OFFICE 2,539,740

HINGED MOLDING FLASK FOR EXTENSIVE ACRYLIC BRIDGEWORK

Samuel Harris, Forest Hills, N. Y.

Application July 14, 1950, Serial No. 173,829

4 Claims. (Cl. 18—33)

This invention relates to dental flasks for forming extensive units of acrylic bridgework and more particularly to a novel three member hinged molding flask which facilitates assembly and disassembly of the members and removal of the plaster from the bridgework and without damaging the bridgework.

An object of this invention is to provide a three member hinged molding flask to encase the bridgework or framework and provide support for the bridgework at the top and bottom, and so that there is no chance for the bridgework to become distorted.

Another object of this invention is to provide a sectionally hinged dental flask which can be readily manipulated and by means of which the operator can observe each step in the production of the bridgework.

Another object of this invention is to provide a dental flask in which a U-shaped piece of bridgework comprising the entire dental arch can be invested all at one time and be fully exposed to view, thus enabling the operator to blend the shadings of the plastic teeth of the entire bridge all in one step.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 4 is a top plan view of the dental flask in open position and showing plastic bridgework therein.

Figure 5 is a side elevation of the dental flask in open position and showing plastic bridgework therein.

Figure 1:
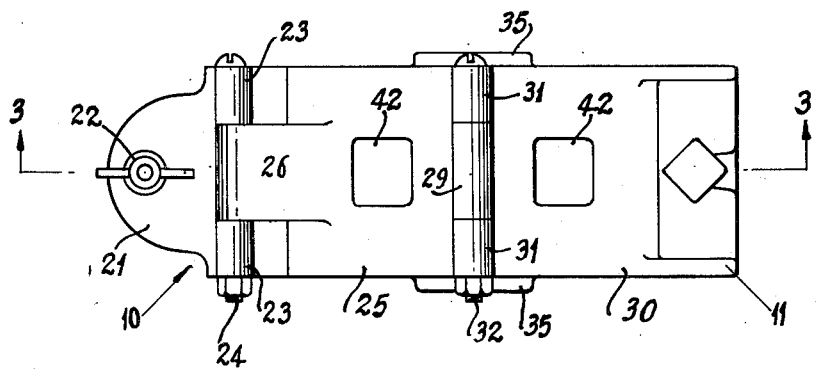
Figure 1 is a top plan view of the three member hinged dental flask in closed position.
Figure 2:
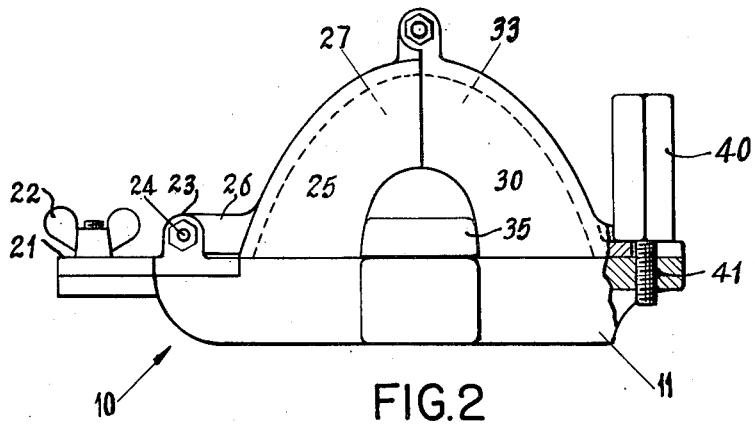
Figure 2 is a side elevation of a dental flask shown in Figure 1.
Figure 3:
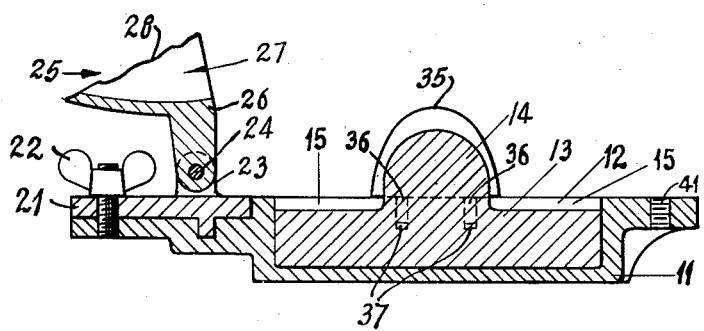
Figure 3 is a cross-sectional view taken on line 3—3 in Figure 1 but with the flask in open position.

In the illustrated embodiment of the invention, the numeral 10 indicates a three member hinged dental flask made of suitable metal and comprising a bottom section 11 having a central cavity 12 of generally rectangular form and of a size to receive a removable platform 13.

The body of the platform 13 is made to fit into the cavity 12 and has a convex upper portion 14 of substantially semi-circular form and which extends crosswise the full width of the platform. The inner walls of the cavity 12 and that of the platform 13 are vertical to permit the platform to be easily inserted in and removed from the bottom section 11.

It is to be noted that in assembled relation, with the platform 13 mounted in the cavity 12, that two spaces 15, 15 are provided in which investment material shaped as flanges 16 and known as artificial stone extends, and prevent contact of the metal of the flask with the molar teeth, thus avoiding breakage and discoloration of the teeth in the bridgework. The depth of the spaces 15, 15 is limited so as to facilitate breaking away of these flanges while thick enough to prevent the flanges from being crushed.

As shown in Figures 4 and 5, the arch portion 17 of the investment 18 is concave due to its contact with the convex upper portion 14 of the platform 13. This concavity causes the removal of substantially one-half the volume of the investment, whereby the molded bridgework comprises a minimum of investment material to be removed from the molded bridgework.

As best shown in Figure 4, which shows a top plan view of the dental flask 10 in open position, an entire arch of bridgework 20 is shown invested in artificial stone in a manner as to be fully visible from end to end from an upright direction.

It will be noted that the investment 18 is mounted in the flask 10 in a vertical position and this makes it possible for the operator to observe the effect of the processing of the respective teeth in step-by-step relation.

For ease of removal and cleaning, I have provided a bracket 21 which is secured to the bottom mold section 11 by a wing nut and bolt 22. The bracket 21 has bearings 23 through which a bolt 24 passes.

An upper flask member 25 has a bearing member 26 extending between the bearings 23 and is thereby pivotally mounted in relation to the bottom flask member 11. The upper flask member 25 is made hollow to provide a cavity 27 for artificial stone in which an impression is taken of one-half of the bridgework 20. The flask member 25 has side flanges 28. The flask member 25 has a bearing 29.

A further upper flask member 30 has bearings 31 spaced apart to receive the bearing 29. A bolt 32 passing through the bearings 29 and 31 connects the upper flask members 25 and 30 in pivotal relation. The upper flask member 30 is also made hollow to provide a cavity 33 for artificial stone in which an impression is taken of the other half of the bridgework 20. The flask member 30 has side flanges 34.

As best shown in Figure 4, I have provided removable supporting side members 35 each having a convex upper surface of substantially semi-elliptical form conforming to the shape of the bridgework. It is to be noted that the lower faces of the flanges 28 and 34 have contours conforming to the contour of the supporting side members 35. Each supporting member 35 has integral pins 36 which fit apertures 37 in the lower flask member 11.

In operation, investment material in soft form is spread over the platform 13 and the bridge is invested in said material. It is to be noted that the bridgework 20 preferably consists of case crowns and dummies 38 made of precious metal and soldered together in bridge form. Acrylic material in plastic form is applied on the exterior or labial and buccal surfaces of the crowns. Wet cellophane paper is then applied over the acrylic material and the upper flask members while filled with investment material is brought down on the plastic material and pressure applied to close the mold member by threading an elongated clamp screw 40 in a thread 41 in the lower flask member 11.

Excess investment material is discharged from the dental flask 10 through vent holes 42 in the body portion of the upper flask members 25 and 30.

It is to be noted that when a complete arch shaped bridgework of acrylic material required processing heretofore, that it required at least two steps or more, thus necessitating much more time, having to re-flask for each operation and curing after each operation.

In accordance with the patent statutes I have described and illustrated the preferred embodiment of my invention, but it will be understood that various changes and modifications can be made therein without departing from the spirit of the invention as defined by the appended claims.

I claim:

1. A three member hinged molding flask adapted for forming extensive units of acrylic bridgework comprising a metal frame, said flask comprising a lower flask member having a central cavity, a removable platform mounted in said cavity, said lower member having supporting side members at opposite sides thereof, an upper flask member pivoted to one end portion of said lower flask member and swingable into supporting relation on said side members, a further upper flask member pivoted to said first upper flask member and being also swingable into supporting relation on said side members, means for securing said further flask member to said lower flask member, said removable platform having a convex upper portion on which concave bridgework is mounted over a layer of molding material, said convex portion of said platform causing said molded material to be concave, whereby the molded bridgework comprises a minimum of material to be removed therefrom.

2. A three member hinged dental flask adapted for forming units of plastic bridgework, said flask comprising a lower flask member having a central cavity, a removable platform mounted in said cavity, said lower member having supporting side members at opposite sides thereof, an upper flask member pivoted to one end portion of said lower flask member and swingable into supporting relation on said side members, a further upper flask member pivoted to said first upper flask member and being also swingable into supporting relation on said side members, means for securing said further flask member to said lower flask member, said removable platform having a convex upper portion on which bridgework is mounted over a layer of molding material, said convex portion of said platform causing said molded material to be concave, whereby the molded bridgework comprises a minimum of material to be removed therefrom.

3. A three member hinged dental flask adapted for forming units of plastic bridgework, said flask comprising a lower flask member having a central cavity, a removable platform mounted in said cavity, said lower member having removable supporting side members at opposite sides thereof, said supporting side members having convex upper surfaces, an upper flask member pivoted to one end portion of said lower flask member and swingable into supporting relation on said convex side members, a further upper flask member pivoted to said first upper flask member and being also swingable into supporting relation on said convex side members, means for securing said further flask member to said lower flask member, said removable platform having a convex upper portion on which bridgework is mounted over a layer of molding material, said convex portion of said platform causing said molded material to be concave, whereby the molded bridgework comprises a minimum of material to be removed therefrom.

4. A three member hinged dental flask adapted for forming extensive units of plastic bridgework, said flask comprising a lower flask member having a central cavity, a removable platform mounted in said cavity, said lower member having removable supporting side members at opposite sides thereof, said supporting side members having convex upper surfaces, an upper flask member pivoted to one end portion of said lower flask member and swingable into supporting relation on said convex side members, a further upper flask member pivoted to said first upper flask member and being also swingable into supporting relation on said convex side members, said swingable upper flask members being pivotally connected to each other at the midportion of the convex portion of said platform, means for securing said further flask member to said lower flask member, said removable platform having a convex upper portion on which bridgework is mounted over a layer of molding material, said convex portion of said platform causing said molded material to be concave, whereby the molded bridgework comprises a minimum of investment material to be removed therefrom.

SAMUEL HARRIS.

REFERENCES CITED

The following references are of record in the file of this patent:

UNITED STATES PATENTS

| Number | Name | Date |
|---|---|---|
| 162,752 | Hunt | May 4, 1875 |
| 2,417,812 | Curren | Mar. 25, 1947 |